(12) United States Patent
Suzumura

(10) Patent No.: US 7,565,946 B2
(45) Date of Patent: Jul. 28, 2009

(54) VEHICLE COUNTING COUNTER-STEER OPERATION BY DRIVER IN OVERSTEER SUPPRESS CONTROL

(75) Inventor: Masato Suzumura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 237 days.

(21) Appl. No.: 11/540,732

(22) Filed: Oct. 2, 2006

(65) Prior Publication Data
US 2007/0095604 A1 May 3, 2007

(30) Foreign Application Priority Data
Oct. 11, 2005 (JP) .............................. 2005-296162

(51) Int. Cl.
B62D 5/04 (2006.01)
(52) U.S. Cl. ........................ 180/444; 180/446; 701/41
(58) Field of Classification Search ................ 180/421, 180/422, 444, 445, 446; 701/41, 42
See application file for complete search history.

(56) References Cited
U.S. PATENT DOCUMENTS 5,373,911 A * 12/1994 Yasui .......................... 180/168
6,931,313 B2 * 8/2005 Kato et al. ..................... 701/41
7,066,295 B2 * 6/2006 Ohta et al. .................. 180/422
2004/0107032 A1 * 6/2004 Farrelly et al. ................ 701/42
2005/0222731 A1 * 10/2005 Ghoneim ...................... 701/41
2005/0273235 A1 * 12/2005 Ohta et al. ..................... 701/41

FOREIGN PATENT DOCUMENTS

| JP | A-10-81247 | 3/1998 |
| JP | A 2004-261162 | 9/2004 |
| JP | A 2006-076386 | 3/2006 |

* cited by examiner

Primary Examiner—Lesley D Morris
Assistant Examiner—Marc A Scharich
(74) Attorney, Agent, or Firm—Oliff & Berridge, PLC

(57) ABSTRACT

When the driver makes a counter-steer operation to steer back the steering wheel during the execution of an automatic oversteer suppress control by the turn behavior control device, the counter-steer of automatically decreasing the steering angle of the steered wheels and the counter-steering by the driver overlap to cause an excessive counter-steering. In order to avoid such a problem, when the driver makes a counter-steering operation while the turn behavior control device is executing the automatic decrease of the steering angle, the amount of automatic decrease of the steering angle is reduced according to the counter-steering operation by the driver.

3 Claims, 3 Drawing Sheets

VEHICLE COUNTING COUNTER-STEER OPERATION BY DRIVER IN OVERSTEER SUPPRESS CONTROL

BACKGROUND OF THE INVENTION

1. Field of the Invention

The present invention relates to a turning behavior control of a vehicle such as an automobile for suppressing an oversteering thereof.

2. Description of the Prior Art

Various devices have been made known as a turning behavior control device for suppressing an oversteering of a vehicle such as an automobile. The oversteering of a vehicle occurs by an excessive steering operation by the driver or a slippage of the vehicle wheels on the road surface, causing a spinning of the vehicle when promoted. The oversteer suppress control is generally executed to steer back the steered wheels in the direction of decreasing the steering angle and/or to brake the front wheel serving at the outside of the turn so that a yaw moment for turning the vehicle toward the outside of the turn is thereby generated.

In a turn suppress control of the vehicle, when a turn suppress yaw moment is applied to the vehicle in one direction and immediately thereafter in the other direction as will be made in a lane changing or a slalom running, an unpleasant feeling is given to the driver or a passenger by a quick reciprocation of the steering direction. In order to avoid such a problem, we have once proposed in Japanese Patent Application 2004-261162 to decrease, at least for a determined period, the speed of application or the magnitude of a second turn suppress yaw moment in the direction opposite to the direction of application of a first turn suppress yaw moment.

SUMMARY OF THE INVENTION

When an oversteering or a spinning promoted therefrom occurs in a turn running of the vehicle, the driver skilled above a certain level will unconsciously make a counter-steering action of rotating the steering wheel in the direction opposite to the oversteering or spinning direction. However, since the conventional turn behavior control device is adapted to decrease the steering angle of the steered wheels upon a detection of an oversteered condition with an estimation of the angle to be subtracted from the oversteered steering angle, when the driver makes a counter-steering action after the turning behavior control device has started its operation, the counter-steering function is liable to become excessive, thereby giving an unpleasant feeling to the driver or a passenger.

In view of the above-mentioned problems in the conventional turn behavior control device, it is the object of the present invention to obviate such a problem in the conventional turn behavior control device.

According to the present invention, the above-mentioned object is accomplished by a vehicle comprising a steering unit adapted to be operated by a driver, and a turn behavior control device for automatically decreasing a steering angle of wheels steered by the steering unit according to an operation of the driver when an oversteered condition of the vehicle is detected, wherein the automatic decrease of the steering angle of the steered wheels by the turn behavior control device is reduced according to a counter-steering operation of the driver when the driver makes the counter-steering operation while the turn behavior control device is automatically decreasing the steering angle of the steered wheels.

When the vehicle is so constructed as described above, it is avoided that the automatic oversteer suppress control by the turn behavior control device and the counter-steering action by the driver overlap one another to cause an excessive steering back of the steered wheels which would give an unpleasant feeling to the driver or a passenger.

The reduction of the automatic decrease of the steering angle of the steered wheels may be done to an extent corresponding to an angle of the counter-steering by the driver.

When the reduction of the automatic decrease of the steering angle of the steered wheels is done to such an extent as described above, the effect of suppressing the oversteer by the counter-steering by the driver is evaluated from the aspect of static magnitude thereof based upon the angle of counter-steering by the driver, so that the automatic suppressing of the oversteering by the turn behavior control device is appropriately controlled against a variety of counter-steering angle by the driver to match the angle of the counter-steering.

The reduction of the automatic decrease of the steering angle of the steered wheels may be done to an extent corresponding to an angular velocity of the counter-steering by the driver.

When the reduction of the automatic decrease of the steering angle of the steered wheels is done to such an extent as described above, the effect of suppressing the oversteer by the counter-steering by the driver is evaluated from the aspect of dynamic magnitude thereof based upon the angular velocity of the counter-steering by the driver, so that the automatic suppressing of the oversteer by the turn behavior control device is appropriately controlled against a variety of counter-steering speed by the driver to keep a proper timing with the counter-steering operation of the driver.

BRIEF DESCRIPTION OF THE DRAWINGS

In the accompanying drawings.

DESCRIPTION OF THE EMBODIMENTS

In the following, the present invention will be described in more detail in the form of some preferred embodiments with reference to the accompanying drawings.

Figure 1:
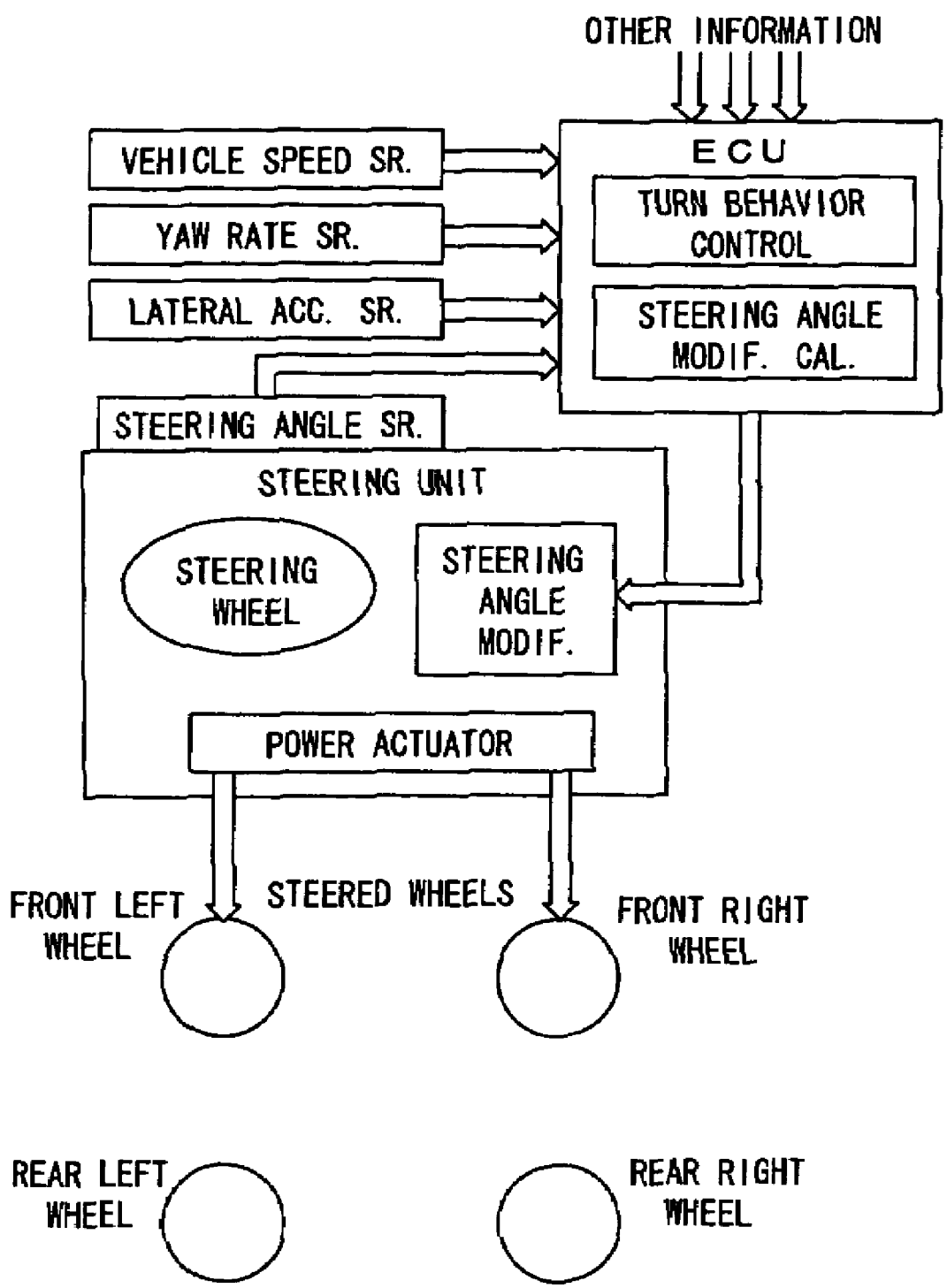
FIG. 1 is a diagrammatic view of the vehicle according to the present invention, showing the constructions related with the invention.

The vehicle diagrammatically shown in FIG. 1 comprises a steering unit adapted to be operated by a driver, and a turn behavior control device for automatically decreasing a steering angle of steered wheels by the steering unit according to a steering operation of the driver when an oversteered condition of the vehicle is detected, and the automatic decrease of the steering angle of the steered wheels by the turn behavior control device is reduced according to a counter-steering operation of the driver when the driver makes the countersteering operation while the turn behavior control device is automatically decreasing the steering angle of the steered wheels. However, the present invention is a kind of software to be incorporated in a computer, of a hardware construction which is already known in this art.

In FIG. 1, the vehicle having front left and front right wheels and rear left and rear right wheels and a vehicle body supported by these wheels but not shown in the figure incorporates a steering unit and an electronic control unit (ECU) which are both known in various forms.

The steering unit includes a steering wheel, a power actuator and a steering angle modifying device, and steers the front left and front right wheels via the power actuator according to a rotating operation of the steering wheel by the driver, wherein the front left and front right wheels are steered by an angle automatically modified from the steering angle of the steering wheel by the steering angle modifying device.

The electronic control unit is substantially constructed by a microcomputer, and as a part of the control computing functions of the microcomputer there are included a turn behavior control portion and a steering angle modification calculating portion related with the present invention.

The electronic control unit is supplied with a signal indicating vehicle speed from a vehicle speed sensor, a signal indicating yaw rate of the vehicle body from a yaw rate sensor, a signal indicating lateral acceleration of the vehicle body from a lateral acceleration sensor, a signal indicating the steering angle by the steering wheel from a steering angle sensor, and other signals indicating other various information as required. The electronic control unit carries out various control calculations according to these input signals and control programs stored beforehand in the microcomputer, and carries out the control according to the present invention and other controls regarding the operation of the vehicle.

Figure 2:
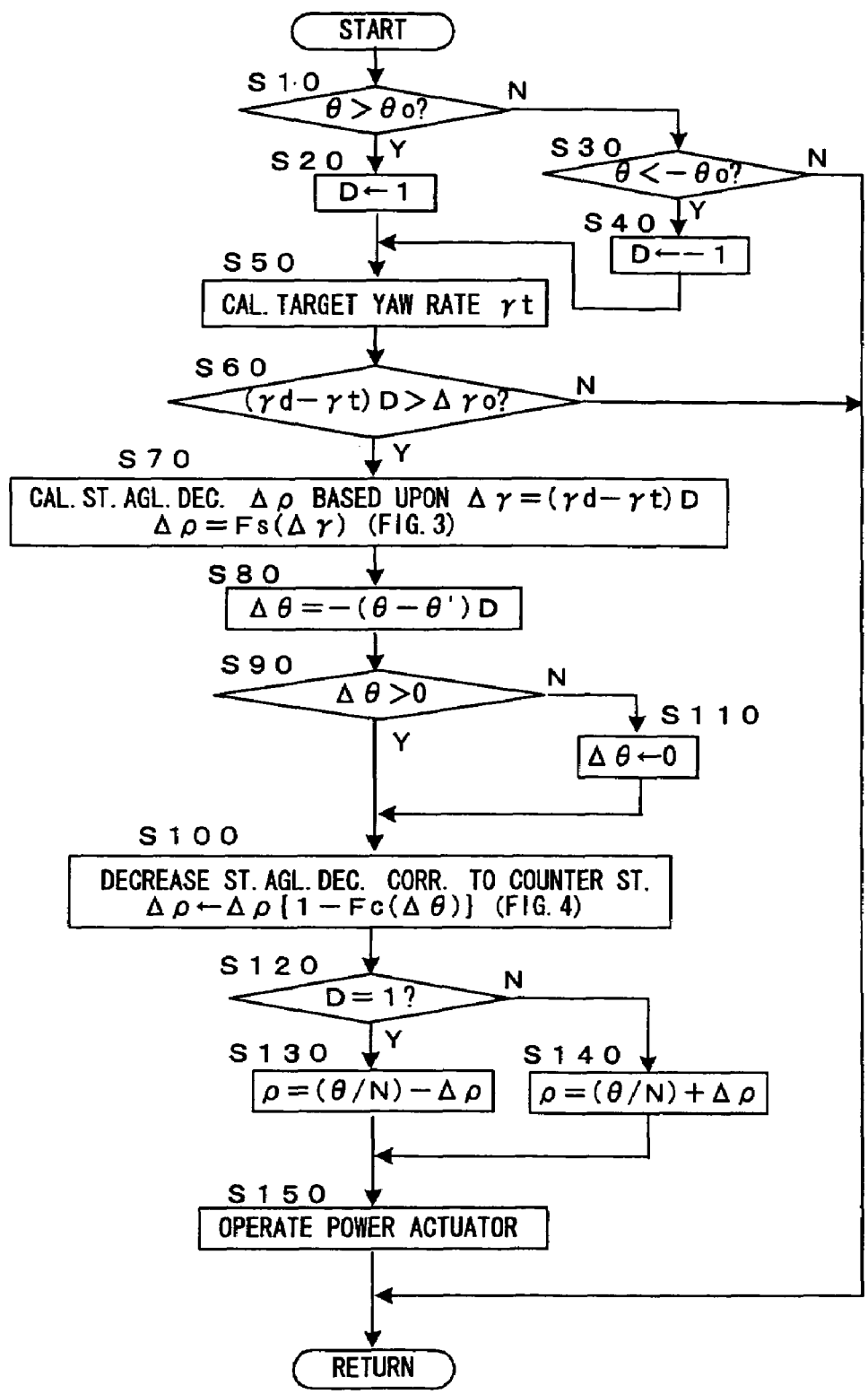
FIG. 2 is a flowchart showing an embodiment of the oversteer suppress control executed in the vehicle according to the present invention.

FIG. 2 is a flowchart showing an embodiment of the oversteer suppress control carried out in the vehicle according to the present invention. The control according to such a flowchart may be repeated at a cycle time of tens to hundreds milliseconds during the driving operation of the vehicle.

When the control is started, in step 10 it is judged if the steering angle θ detected by the steering angle sensor is larger than a determined lower limit θo or not. Herein the steering angle is made positive when it is steered leftward from the neutral position and negative when it is steered rightward from the neutral position. The lower limit θo is an absolute value of such a steering angle which, when the vehicle is steered to exceed, the vehicle is liable to get into an oversteered condition to be controlled by the present invention. When the answer is yes (Y), the control proceeds to step 20 and the value of an index D is set to 1. When the answer is no (N), the control proceeds to step 30, and it is judged if θ is smaller than −θo. When the answer is yes, the control proceeds to step 40 and the value of D is set to −1. When the answer of step 30 is no, it means that no much steering is made leftward or rightward, so in this case the control according to this flowchart is ended.

The control proceeds from step 20 or 40 to step 50, and expressing the steering angle detected by the steering angle sensor as θ, the vehicle speed detected by the vehicle speed sensor as V, the lateral acceleration of the vehicle body detected by the lateral acceleration sensor as Gy, the gear ratio of the steering unit as N, the wheel base as L, and the stability factor as Kh, the yaw rate of the vehicle body due under the values of those parameters, i.e. the target yaw rate γt, is calculated as follows:

$$\gamma t = \{1/(1+Kh \cdot V^2)\} V \cdot \theta/(N \cdot L)$$

$$Gy = \gamma t \cdot V$$

From the above two equations, $$\gamma t = V \cdot \theta/(N \cdot L) - Kh \cdot Gy \cdot V$$

Then in step 60, it s judged if the difference between the yaw rate value γd detected by the yaw rate sensor and the target yaw rate γt calculated above is larger than a determined difference value Δγo or not. According to the above-mentioned provisions that the steering angle for the left turn is made positive, while the steering angle for the right turn is made negative, the yaw rate is also made positive in the left turn and negative in the right turn. Since D is made 1 in the leftward steering and −1 in the rightward steering, taking Δγo as an appropriate positive value, by judging if (γd−γt) D is larger than Δγo or not, in both of the left turn and the right turn, it is judged if the absolute value of the actual yaw rate is larger than the absolute value of the target yaw rate beyond a determined limit value, or, in other words, if the vehicle is in an oversteered condition beyond a determined extent. When the answer is yes, the control proceeds to step 70, while when the answer is no, it means that no oversteering condition is occurring, so in this case the control according to this flowchart is ended.

Figure 3:
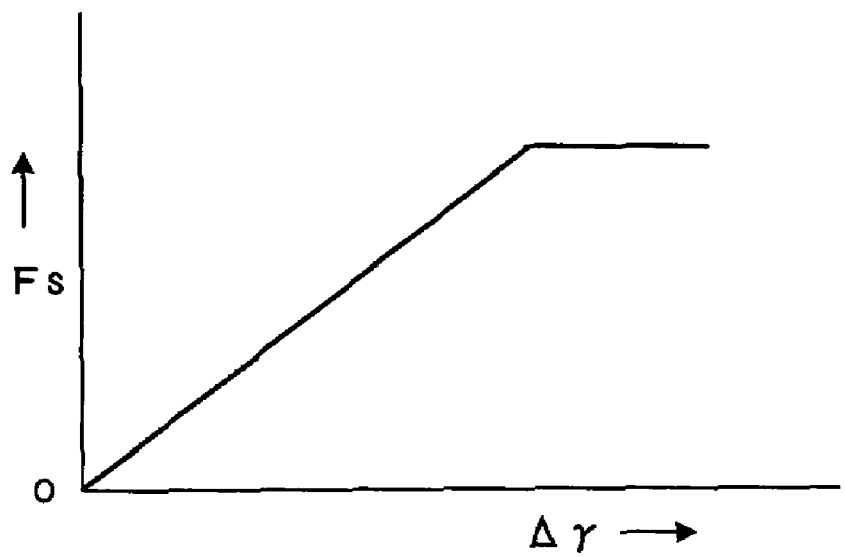
FIG. 3 is a map showing an example of the manner of calculating the steering angle decreasing amount $\Delta\rho$ of the steered wheels for suppressing the oversteer according to the extent of oversteer $\Delta\gamma$ in the form of a function Fs in step 70.

In step 70, in both of the left turn and the right turn, a steering angle decreasing amount Δρ for suppressing the oversteering is calculated against the absolute value Δγ=(γd−γt) D of the difference of the actual yaw rate γd from the target yaw rate γt according to an appropriate function Fs(Δγ) based upon the variable Δγ. This may be done by referring to a map such as shown in FIG. 3 with the value of Δγ.

Then in step 80, the difference between the value θ of the steering angle in the current flow cycle and the value θ' of the steering angle in the previous flow cycle is calculated. In order to detect if a counter-steering is being made in both of the left turn and the rights turn, the difference between θ and θ' is detected as a value Δθ=−(θ−θ')D which is positive when a counter-steering is being made.

Then in step 90, it is judged if Δθ is positive or not. When the answer is yes, the control proceeds directly to step 100, while when the answer is no, the control proceeds to step 110, where Δθ is reset to 0, and then the control proceeds to step 100.

In step 100, based upon the value of Δθ the reduction ratio according to the counter-steering by the driver for the amount of decreasing the steering angle by the automatic oversteer suppress control is calculated. This is to obtain a reduction ratio Fc(Δθ) as a function based upon Δθ, and to modify the steering angle decreasing amount Δρ calculated in step 70 such as to be Δρ{1−Fc(Δθ)}.

Figure 4:
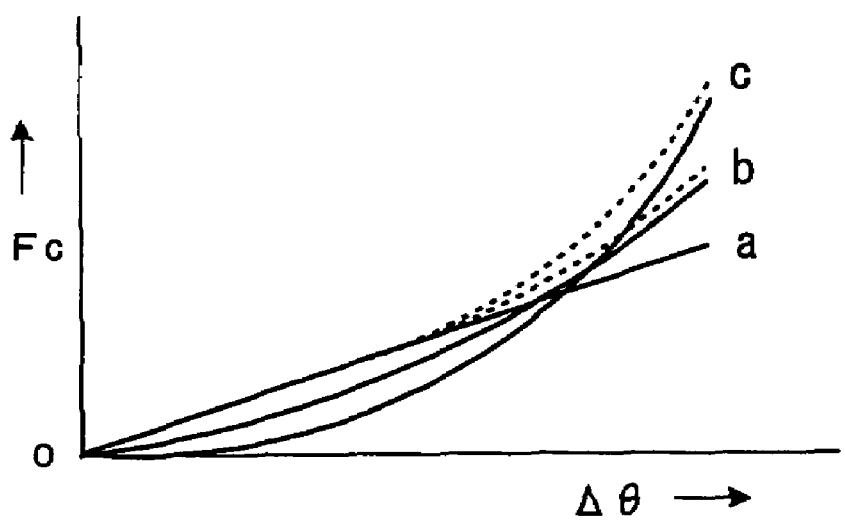
FIG. 4 is a map showing an example of the manner of reducing the steering angle decreasing amount $\Delta\rho$ of the steered wheels for suppressing the oversteer according to the magnitude of steering angle $\theta$ as well as the magnitude of counter-steering speed by the driver in the form of a function Fc in step 100.

The value of Fc(Δθ) may be obtained by referring to a map such as shown in FIG. 4 based upon the value of Δθ. In the map of FIG. 4, lines a, b and c incorporate gradually more in said order the effect of the speed of counter-steering by the driver into the reduction ratio for reducing the steering angle by the automatic oversteer suppress control. Δθ is the amount of counter-steering by the driver per one cycle circulating through the flowchart of FIG. 2.

According to the steering angle θ changing by Δθ as each one cycle lapses, the original steering angle decreasing amount Δρ by the automatic oversteer suppress control per one cycle is reduced as much as Δρ·Fc(Δθ), so that the reduction of the automatic steering angle decreasing amount is done to an extent corresponding to an angle of the counter-steering by the driver.

Further, the magnitude of Δθ expresses the increase the counter-steering angle per one cycle through the flowchart of FIG. 2, and so it also expresses the magnitude of the speed of steering back in the counter-steering. Therefore, the upward cambering of the lines a, b and c expresses how much the speed of steering back in the counter-steering is reflected on the reduction of the automatic steering angle decrease.

In other words, comparing the lines a, b and c with each other, the line b reflects more of the speed of steering back in the counter-steering by the driver on the reduction of the automatic decrease of the steering angle than the line a, and the line c reflects more of the speed of steering back in the counter-steering by the driver on the reduction of the automatic decrease of the steering angle than the line b.

The reflection of the speed of steering back in the counter-steering by the driver on the reduction of the automatic steering angle decrease may be made to be added on the reduction of the automatic steering angle decrease according to the angle of counter-steering such that the line b is cambered upward from a middle portion of the line a, and the line c is cambered upward from a middle portion of the line b, as exemplarily shown by dotted lines. In any event, the reduction of the automatic decrease of the steering angle of the steered wheels is done to an extent corresponding to the angular velocity of the counter-steering by the driver, in addition to reducing the automatic decrease of the steering angle of the steered wheels to an extent corresponding to the angle of the counter-steering by the driver.

Then, in step 120, it is judged if D is 1 or not. In the left turn, the answer is yes, while in the right turn, the answer is no. When the answer is yes, the control proceeds to step 130, and the steering angle ρ for the steered wheels is calculated by decreasing the steering angle for the steered wheels obtained by dividing the steering operation angle θ at that time by the gear ratio N of the steering unit as less as Δρ. When the answer is no, the control proceeds to step 140, and the steering angle ρ for the steered wheels is calculated by arithmetically increasing the negative steering angle for the steered wheels obtained by dividing the negative steering operation angle θ at that time by the gear ratio N of the steering unit as much as Δρ.

Then, in step 150, the power actuator is operated to make the steering angle of the steered wheels to ρ.

Although the present invention has been described in detail with respect to a preferred embodiment thereof, it will be apparent for those skilled in the art that various modifications are possible with respect to the shown embodiment within the scope of the present invention.

The invention claimed is:

1. A vehicle comprising a steering unit adapted to be operated by a driver, and a turn behavior control device for automatically decreasing a steering angle of wheels steered by the steering unit according to an operation of the driver as much as an amount calculated based upon a turning condition of the vehicle when an oversteered condition of the vehicle is detected, wherein the amount of the automatic decrease of the steering angle of the steered wheels by the turn behavior control device is reduced as much as an amount calculated based upon a counter-steering motion of steering wheel when the driver makes a counter-steering operation while the turn behavior control device is automatically decreasing the steering angle of the steered wheels.

2. A vehicle according to claim 1, wherein the reduction of the automatic decrease of the steering angle of the steered wheels is done to an extent corresponding to an angle of the counter-steering by the driver.

3. A vehicle according to claim 1, wherein the reduction of the automatic decrease of the steering angle of the steered wheels is done to an extent corresponding to an angular velocity of the counter-steering by the driver.

* * * * *